US012612050B2

(12) United States Patent
Harvey et al.

(10) Patent No.: US 12,612,050 B2
(45) Date of Patent: Apr. 28, 2026

(54) DETERMINING ACCEPTABLE DRIVING BEHAVIOR BASED ON VEHICLE SPECIFIC CHARACTERISTICS

(71) Applicant: State Farm Mutual Automobile Insurance Company, Bloomington, IL (US)

(72) Inventors: Brian N. Harvey, Bloomington, IL (US); Matthew Eric Riley, Sr., Heyworth, IL (US); Joseph Robert Brannan, Bloomington, IL (US); J. Lynn Wilson, Normal, IL (US); Ryan Gross, Normal, IL (US)

(73) Assignee: State Farm Mutual Automobile Insurance Company

( * ) Notice: Subject to any disclaimer, the term of this patent is extended or adjusted under 35 U.S.C. 154(b) by 0 days.

(21) Appl. No.: 18/662,462

(22) Filed: May 13, 2024

(65) Prior Publication Data

US 2024/0294173 A1     Sep. 5, 2024

Related U.S. Application Data

(63) Continuation of application No. 17/745,036, filed on May 16, 2022, now Pat. No. 11,981,335, which is a
(Continued)

(51) Int. Cl.
*B60W 40/09*          (2012.01)
*G06Q 30/0645*      (2023.01)
(Continued)

(52) U.S. Cl.
CPC ......... *B60W 40/09* (2013.01); *G06Q 30/0645* (2013.01); *G06Q 50/40* (2024.01); *G07C 5/008* (2013.01)

(58) Field of Classification Search
CPC ... B60W 40/09; G06Q 50/40; G06Q 30/0645; G07C 5/008
(Continued)

(56) References Cited

U.S. PATENT DOCUMENTS 9,087,099 B2    7/2015  Camacho et al.
9,135,803 B1    9/2015  Fields et al.
(Continued)

FOREIGN PATENT DOCUMENTS

EP          3239686 A1    11/2017
EP          3578433 A1     4/2019
(Continued)

OTHER PUBLICATIONS

Goodwin, "Policy Incentives to Change Behaviour in Passenger Transport," OECD International Transport Forum, Leipzig, May 2008, Transport and Energy: The Challenge of Climate Change. 1-34 (May 2008).
(Continued)

*Primary Examiner* — James J Yang
*Assistant Examiner* — Thang D Tran
(74) *Attorney, Agent, or Firm* — Lee & Hayes, P.C.

(57)          ABSTRACT

In a method for applying penalties or incentives to a driver of a rented vehicle, an indication that the driver has agreed to terms for renting the vehicle from the vehicle owner is received, with the terms including the potential application of penalties or incentives to the driver based on driving behavior. Telematics data, indicative of operation of the rented vehicle by the driver during a period of time, is also received. By analyzing the telematics data, one or more driving behaviors of the driver during the time period is/are identified. One or more characteristics of the rented vehicle are also determined. One or more penalties or incentives are caused to be applied to the driver, based on the driving
(Continued)

behavior(s) and the one or more characteristics of the rented vehicle.

20 Claims, 4 Drawing Sheets

Related U.S. Application Data continuation of application No. 16/861,080, filed on Apr. 28, 2020, now Pat. No. 11,332,149, which is a continuation of application No. 16/267,047, filed on Feb. 4, 2019, now Pat. No. 10,668,930.

(51) Int. Cl.
    *G06Q 50/40* (2024.01)
    *G07C 5/00* (2006.01)

(58) Field of Classification Search
    USPC .......................................................... 340/576
    See application file for complete search history.

(56) References Cited

U.S. PATENT DOCUMENTS

| | | | |
|---|---|---|---|
| 9,311,271 B2 | 4/2016 | Wright | |
| 9,520,006 B1 | 12/2016 | Sankovsky et al. | |
| 9,633,487 B2 | 4/2017 | Wright | |
| 9,701,279 B1 | 7/2017 | Morgan et al. | |
| 9,786,009 B2* | 10/2017 | Schumann, Jr. | G06Q 40/08 |
| 9,805,601 B1 | 10/2017 | Fields et al. | |
| 9,830,748 B2 | 11/2017 | Rosenbaum | |
| 9,990,782 B2 | 6/2018 | Rosenbaum | |
| 10,026,237 B1 | 7/2018 | Fields et al. | |
| 10,049,505 B1* | 8/2018 | Harvey | B60R 16/0234 |
| 10,157,422 B2 | 12/2018 | Jordan Peters et al. | |
| 10,192,369 B2 | 1/2019 | Wright | |
| 10,198,879 B2 | 2/2019 | Wright | |
| 10,269,190 B2 | 4/2019 | Rosenbaum | |
| 10,388,157 B1 | 8/2019 | Hayes et al. | |
| 10,445,758 B1 | 10/2019 | Bryer et al. | |
| 10,467,824 B2 | 11/2019 | Rosenbaum | |
| 10,540,892 B1 | 1/2020 | Fields et al. | |
| 10,832,261 B1* | 11/2020 | Chan | G06Q 30/0255 |
| 10,885,539 B1* | 1/2021 | Purgatorio | B60W 40/09 |
| 10,915,964 B1* | 2/2021 | Purgatorio | G06Q 40/08 |
| 10,956,982 B1 | 3/2021 | Hayward et al. | |
| 10,984,479 B1 | 4/2021 | Kyne et al. | |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 11,769,119 B1* | 9/2023 | Faga | G06Q 10/20 |
| | | | 705/305 |
| 2003/0225494 A1 | 12/2003 | Coelingh | |
| 2005/0137757 A1 | 6/2005 | Phelan et al. | |
| 2007/0008183 A1 | 1/2007 | Levi | |
| 2008/0133432 A1* | 6/2008 | Ramseyer | G06Q 10/02 |
| | | | 701/29.6 |
| 2008/0162373 A1 | 7/2008 | Adler et al. | |
| 2008/0243558 A1 | 10/2008 | Gupte | |
| 2008/0255722 A1 | 10/2008 | McClellan et al. | |
| 2009/0109037 A1 | 4/2009 | Farmer | |
| 2009/0210257 A1 | 8/2009 | Chalfant et al. | |
| 2009/0222338 A1 | 9/2009 | Hamilton, II et al. | |
| 2010/0030582 A1 | 2/2010 | Rippel et al. | |
| 2010/0087984 A1 | 4/2010 | Joseph | |
| 2010/0106534 A1 | 4/2010 | Robinson et al. | |
| 2010/0131307 A1 | 5/2010 | Collopy et al. | |
| 2010/0175656 A1* | 7/2010 | Doub | H02J 7/005 |
| | | | 123/179.3 |
| 2011/0029181 A1* | 2/2011 | Hyde | G07B 15/063 |
| | | | 701/31.4 |
| 2011/0029358 A1 | 2/2011 | Hyde et al. | |
| 2011/0063099 A1 | 3/2011 | Miller et al. | |

| | | | |
|---|---|---|---|
| 2011/0087525 A1* | 4/2011 | Boss | G06Q 50/265 |
| | | | 705/14.1 |
| 2011/0106591 A1 | 5/2011 | Eckhoff et al. | |
| 2011/0258044 A1 | 10/2011 | Kargupta | |
| 2011/0288891 A1* | 11/2011 | Zaid | G06Q 40/08 |
| | | | 705/26.4 |
| 2012/0074770 A1 | 3/2012 | Lee | |
| 2012/0089442 A1 | 4/2012 | Olsson et al. | |
| 2013/0013347 A1 | 1/2013 | Ling et al. | |
| 2013/0073112 A1 | 3/2013 | Phelan et al. | |
| 2013/0138460 A1* | 5/2013 | Schumann, Jr. | G06Q 50/40 |
| | | | 705/4 |
| 2013/0173128 A1 | 7/2013 | Syed | |
| 2013/0173129 A1* | 7/2013 | Syed | B60W 50/14 |
| | | | 701/70 |
| 2013/0217333 A1 | 8/2013 | Sprigg et al. | |
| 2013/0290199 A1 | 10/2013 | Camacho et al. | |
| 2014/0019167 A1 | 1/2014 | Cheng et al. | |
| 2014/0046701 A1* | 2/2014 | Steinberg | B60W 40/10 |
| | | | 705/4 |
| 2014/0129053 A1 | 5/2014 | Kleve et al. | |
| 2014/0129113 A1* | 5/2014 | Van Wiemeersch | F02D 28/00 |
| | | | 701/1 |
| 2014/0129301 A1* | 5/2014 | Van Wiemeersch | G07B 15/02 |
| | | | 705/13 |
| 2014/0142805 A1* | 5/2014 | Frye | B60K 35/00 |
| | | | 701/36 |
| 2014/0210625 A1 | 7/2014 | Nemat-Nasser | |
| 2014/0229258 A1 | 8/2014 | Seriani | |
| 2014/0257662 A1 | 9/2014 | Takeuchi et al. | |
| 2014/0257874 A1 | 9/2014 | Hayward et al. | |
| 2014/0310186 A1 | 10/2014 | Ricci | |
| 2014/0372017 A1 | 12/2014 | Armitage | |
| 2015/0025917 A1* | 1/2015 | Stempora | G02B 27/0093 |
| | | | 705/4 |
| 2015/0057875 A1 | 2/2015 | McGinnis et al. | |
| 2015/0081404 A1 | 3/2015 | Basir | |
| 2015/0112546 A1 | 4/2015 | Ochsendorf et al. | |
| 2015/0120083 A1 | 4/2015 | Gurovich et al. | |
| 2015/0178661 A1 | 6/2015 | Keaveny et al. | |
| 2015/0213420 A1 | 7/2015 | Krishnamurthy et al. | |
| 2015/0213519 A1* | 7/2015 | Krishnamurthy | G06Q 30/0283 |
| | | | 705/35 |
| 2015/0254955 A1 | 9/2015 | Fields et al. | |
| 2015/0269681 A1* | 9/2015 | Kalinadhabhotla | G06Q 40/08 |
| | | | 705/4 |
| 2015/0324923 A1 | 11/2015 | Christensen et al. | |
| 2015/0371153 A1 | 12/2015 | Lohmeier et al. | |
| 2016/0014062 A1 | 1/2016 | Patel | |
| 2016/0059775 A1 | 3/2016 | Gorse et al. | |
| 2016/0086285 A1* | 3/2016 | Jordan Peters | G08G 1/096827 |
| | | | 701/484 |
| 2016/0102840 A1 | 4/2016 | Feurle et al. | |
| 2016/0364812 A1 | 12/2016 | Cao | |
| 2017/0076395 A1 | 3/2017 | Sedlik | |
| 2017/0098231 A1 | 4/2017 | Dietrich | |
| 2017/0206717 A1 | 7/2017 | Kuhnapfel | |
| 2017/0291611 A1 | 10/2017 | Innes et al. | |
| 2017/0301220 A1 | 10/2017 | Jarrell et al. | |
| 2017/0305434 A1 | 10/2017 | Ratnasingam | |
| 2017/0365169 A1 | 12/2017 | Tennent et al. | |
| 2017/0371608 A1 | 12/2017 | Wasserman | |
| 2018/0053354 A1 | 2/2018 | Jenkins et al. | |
| 2018/0061232 A1 | 3/2018 | Madigan et al. | |
| 2018/0075380 A1 | 3/2018 | Perl et al. | |
| 2018/0097883 A1 | 4/2018 | Chow et al. | |
| 2018/0108058 A1 | 4/2018 | Cotton et al. | |
| 2018/0108189 A1* | 4/2018 | Park | H04L 67/12 |
| 2018/0130095 A1* | 5/2018 | Khoury | G01C 21/3617 |
| 2018/0141562 A1 | 5/2018 | Singhal | |
| 2018/0154867 A1 | 6/2018 | Golduber | |
| 2018/0154908 A1 | 6/2018 | Chen | |
| 2018/0158329 A1 | 6/2018 | Benhammou et al. | |
| 2018/0174457 A1 | 6/2018 | Taylor | |
| 2018/0178797 A1 | 6/2018 | Seaman et al. | |
| 2018/0182185 A1* | 6/2018 | Tong | G07C 5/0841 |
| 2018/0237016 A1* | 8/2018 | Khafagy | B61H 1/00 |
| 2018/0240153 A1 | 8/2018 | Kim | |

(56) References Cited

U.S. PATENT DOCUMENTS

| | | | |
|---|---|---|---|
| 2018/0281812 A1 | 10/2018 | Tochioka | |
| 2018/0285885 A1* | 10/2018 | Laberteaux | H04L 9/3247 |
| 2018/0286143 A1* | 10/2018 | Deshmukh | G07C 5/006 |
| 2018/0293552 A1* | 10/2018 | Zhang | G06Q 10/06313 |
| 2018/0293687 A1* | 10/2018 | Hardee | G06Q 10/06315 |
| 2018/0322775 A1* | 11/2018 | Chase | G05D 1/226 |
| 2019/0011931 A1* | 1/2019 | Selvam | G05D 1/0088 |
| 2019/0066409 A1 | 2/2019 | Moreira Da Mota | |
| 2019/0066535 A1 | 2/2019 | Pifko et al. | |
| 2019/0111933 A1 | 4/2019 | Schoeggl et al. | |
| 2019/0147263 A1* | 5/2019 | Kuehnle | G07C 5/0866 |
| | | | 340/439 |
| 2019/0196503 A1 | 6/2019 | Abari et al. | |
| 2019/0291738 A1* | 9/2019 | Madduri | G07C 5/0808 |
| 2019/0378350 A1* | 12/2019 | DeRouen | G07C 5/008 |
| 2019/0378351 A1* | 12/2019 | Dorenkamp | G07C 5/0816 |
| 2020/0033868 A1 | 1/2020 | Palanisamy et al. | |
| 2020/0074491 A1* | 3/2020 | Scholl | G06F 11/3423 |
| 2020/0172112 A1 | 6/2020 | Kawashima | |
| 2021/0166323 A1 | 6/2021 | Fields et al. | |
| 2022/0092893 A1 | 3/2022 | Rosenbaum | |
| 2022/0274605 A1 | 9/2022 | Harvey et al. | |
| 2022/0340148 A1 | 10/2022 | Rosenbaum | |
| 2022/0391933 A1* | 12/2022 | Waishampayan | H04L 67/02 |
| 2023/0060300 A1 | 3/2023 | Rosenbaum | |

FOREIGN PATENT DOCUMENTS

| | | | |
|---|---|---|---|
| EP | 3730375 A1 | 4/2020 | |
| EP | 3960576 A1 | 3/2022 | |
| EP | 4190659 A1 | 6/2023 | |
| EP | 4190660 A1 | 6/2023 | |
| WO | 2017142536 A1 | 8/2017 | |

OTHER PUBLICATIONS

Griffiths, "Telematics is revolutionising fleet management", Connected Car, Financial Times. 1-4 (Apr. 18, 2016).

Hampshire et al., "Market Analysis and Potential Growth", Peer-to-Peer Carsharing, Transportation Research Record Journal of the Transportation Research Board. 119-126 (Dec. 2011).

Kantor et al., "Design of Algorithms for Payment Telematics Systems Evaluating Driver's Driving Style," Transactions of Transport Sciences, 7:9-16 (Jan. 2014).

Mortimer, et al., "The effect of 'smart' financial incentives on driving behaviour of novice drivers," Accident Analysis and Prevention, 119:68-79 (2018).

Office Action for U.S. Appl. No. 16/861,080, mailed on Apr. 16, 2021, Brian N. Harvey, "Determining Acceptable Driving Behavior Based on Vehicle Specific Characteristics", 40 Pages.

Office Action for U.S. Appl. No. 17/745,036, mailed on Sep. 6, 2023, Brian N. Harvey, "Determining Acceptable Driving Behavior Based on Vehicle Specific Characteristics", 73 pages.

Office Action for U.S. Appl. No. 16/861,080, mailed on Aug. 27, 2021, Brian N. Harvey, "Determining Acceptable Driving Behavior Based on Vehicle Specific Characteristics", 45 pages.

* cited by examiner

100

120  RENTER MOBILE DEVICE

122  OWNER MOBILE DEVICE

102  SERVER

104  PROCESSOR

106  MEMORY

108  COMMUNICATION INTERFACE

110  TELEMATICS DATA ANALYSIS UNIT

112  PENALTY/INCENTIVE APPLICATION UNIT

118  DRIVING SCORE SERVER

116  RENTED VEHICLE CHARACTERISTICS SERVER

114

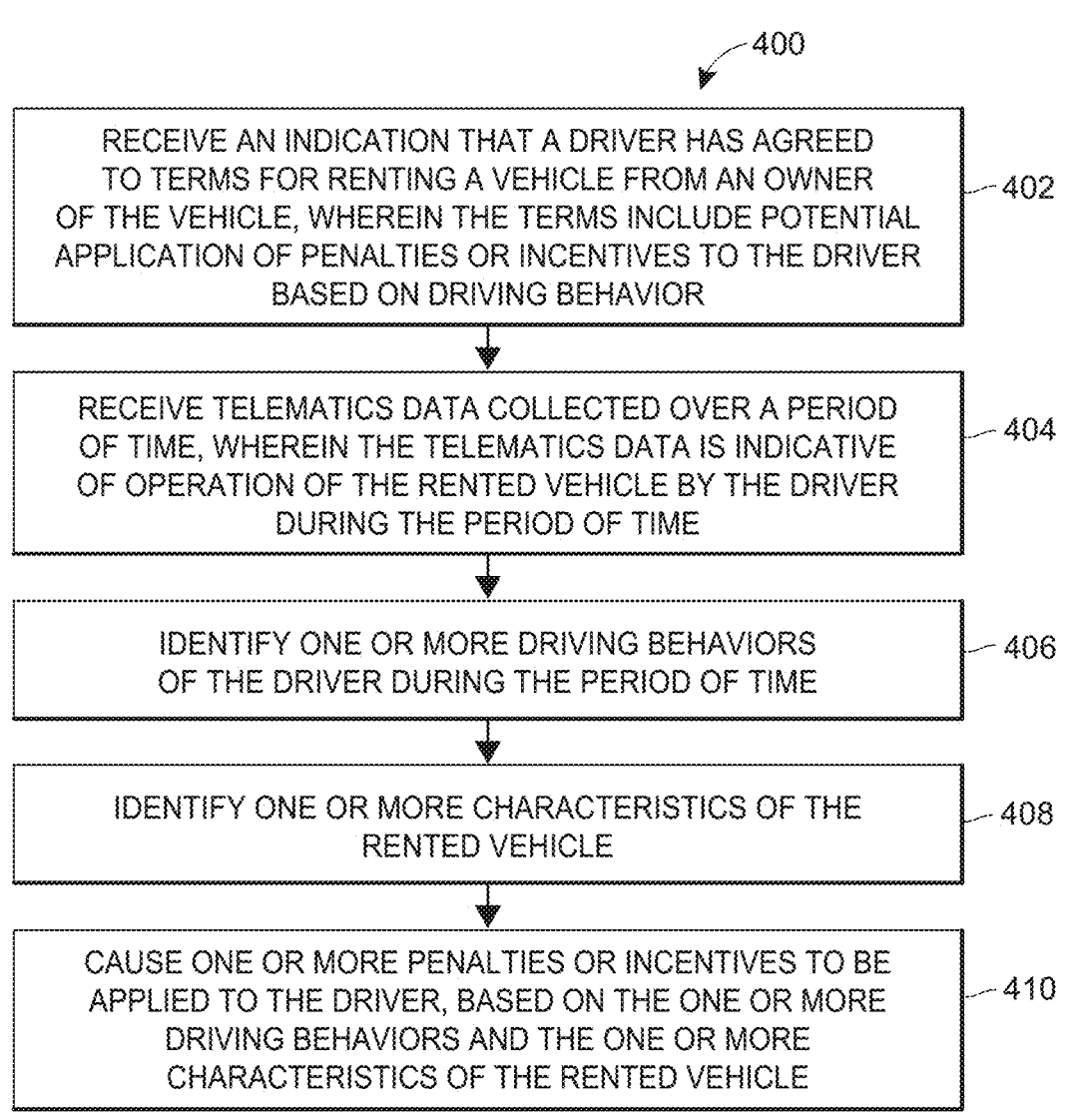

400

RECEIVE AN INDICATION THAT A DRIVER HAS AGREED TO TERMS FOR RENTING A VEHICLE FROM AN OWNER OF THE VEHICLE, WHEREIN THE TERMS INCLUDE POTENTIAL APPLICATION OF PENALTIES OR INCENTIVES TO THE DRIVER BASED ON DRIVING BEHAVIOR — 402

RECEIVE TELEMATICS DATA COLLECTED OVER A PERIOD OF TIME, WHEREIN THE TELEMATICS DATA IS INDICATIVE OF OPERATION OF THE RENTED VEHICLE BY THE DRIVER DURING THE PERIOD OF TIME — 404

IDENTIFY ONE OR MORE DRIVING BEHAVIORS OF THE DRIVER DURING THE PERIOD OF TIME — 406

IDENTIFY ONE OR MORE CHARACTERISTICS OF THE RENTED VEHICLE — 408

CAUSE ONE OR MORE PENALTIES OR INCENTIVES TO BE APPLIED TO THE DRIVER, BASED ON THE ONE OR MORE DRIVING BEHAVIORS AND THE ONE OR MORE CHARACTERISTICS OF THE RENTED VEHICLE — 410

FIG. 4

DETERMINING ACCEPTABLE DRIVING BEHAVIOR BASED ON VEHICLE SPECIFIC CHARACTERISTICS

CROSS REFERENCE TO RELATED APPLICATIONS

This application is a continuation of, and claims priority to, U.S. patent application Ser. No. 17/745,036, filed on May 16, 2022, which is a continuation of, and claims priority to U.S. patent application Ser. No. 16/861,080, filed on Apr. 28, 2020, now U.S. Pat. No. 11,332,149, issued May 17, 2022, which is a continuation of, and claims priority to, U.S. patent application Ser. No. 16/267,047, filed on Feb. 4, 2019, now U.S. Pat. No. 10,668,930, issued Jun. 2, 2020, the entire contents of which are incorporated herein by reference.

FIELD OF THE DISCLOSURE

The present disclosure generally relates to vehicle telematics and, more specifically, to systems and methods for applying one or more penalties and/or incentives to a driver of a rented vehicle based on telematics data.

BACKGROUND

Current technologies make use of vehicle telematics data to assess driving behavior. For example, the telematics data may be collected and analyzed to determine the acceleration, braking and/or cornering habits of a driver of a vehicle, and the results of the analysis may be used to measure the performance of the driver over time. The telematics data may be generated by sensors on the vehicle, or by a mobile device (e.g., smart phone) carried by the driver, for example. The measured performance may then be used for various purposes, such as modifying an insurance rating of the driver. More recently, it has been proposed that telematics data also be used in connection with car rental services, including peer-to-peer car rentals, to score potential renters (e.g., so that vehicle owners may avoid renting their vehicles to certain types of drivers).

Typically, car rental services utilize terms of a rental agreement to constrain renter use of the rented vehicle. However, such terms are not able to constrain or limit many driving behaviors of a renter while the renter is operating a vehicle. This may occur because car rental services are not able to detect such driving behaviors, and as a result the car rental services cannot incorporate such driving behaviors into a rental agreement. Thus, car rental services may rely on the vehicle owner trusting the renter to not misuse the rented vehicle. However, vehicle owners may hesitate to trust renters they do not personally know. Unconstrained use of the rented vehicle on the part of the renter may result in increased maintenance and the associated costs and time for the vehicle owner. For example, frequent hard braking by renters may require that the owner replace the brake pads and rotors more often. This is especially problematic for vehicle owners in peer-to-peer vehicle rental services. For these vehicle owners, the rented vehicle may be their primary vehicle, and associated costs and times of maintenance may be unmanageable.

For these reasons, there is a need for systems and methods that mitigate the problems of vehicle owner hesitation with respect to renting a vehicle and facilitate the rental of more vehicles for the vehicle renters with less risk to the vehicle owners.

SUMMARY

The present embodiments may, inter alia, utilize telematics data indicative of operation of a rented vehicle by the driver/renter during a period of time to apply one or more penalties and/or incentives to the driver, as agreed upon in the terms for renting the vehicle from the owner. In this way, the embodiments may establish trust between the owner of the vehicle and renter (or at least, provide the owner with a certain comfort level even if the renter cannot be fully trusted) by detecting and incentivizing or penalizing driving behaviors.

In one aspect, a method of incentivizing and/or penalizing vehicle renters may include receiving, at one or more processors, an indication that a driver has agreed to terms for renting a vehicle from an owner of the vehicle. The terms may include potential application of penalties or incentives to the driver based on driving behavior. The method may also include receiving, at the one or more processors, telematics data collected over a period of time. The telematics data may be indicative of operation of the rented vehicle by the driver during the period of time. The method may also include identifying, by the one or more processors analyzing the telematics data, one or more driving behaviors of the driver during the period of time. The method may further include identifying, by the one or more processors, one or more characteristics of the rented vehicle. The method may also include causing, by the one or more processors, one or more penalties or incentives to be applied to the driver. The one or more penalties may be based on the one or more driving behaviors and the one or more characteristics of the rented vehicle.

In another aspect, a tangible, non-transitory computer-readable medium may store instructions that, when executing by one or more processors, cause one or more processors to receive an indication that a driver has agreed to terms for renting a vehicle from an owner of the vehicle. The terms may include potential application of penalties or incentives to the driver based on driving behavior. The instructions may also cause the one or more processors to receive telematics data collected over a period of time. The telematics data may be indicative of operation of the rented vehicle by the driver during the period of time. The instructions may also cause the one or more processors to identify one or more driving behaviors of the driver during the period of time. The instructions may also cause the one or more processors to identify one or more characteristics of the rented vehicle. The instructions may also cause the one or more processors to cause one or more penalties or incentives to be applied to the driver. The one or more penalties may be based on the one or more driving behaviors and the one or more characteristics of the rented vehicle.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with one possible embodiment thereof.

FIG. 4 illustrates an exemplary method of which may cause one or more penalties and/or incentives to be applied.

DETAILED DESCRIPTION

Figure 1:
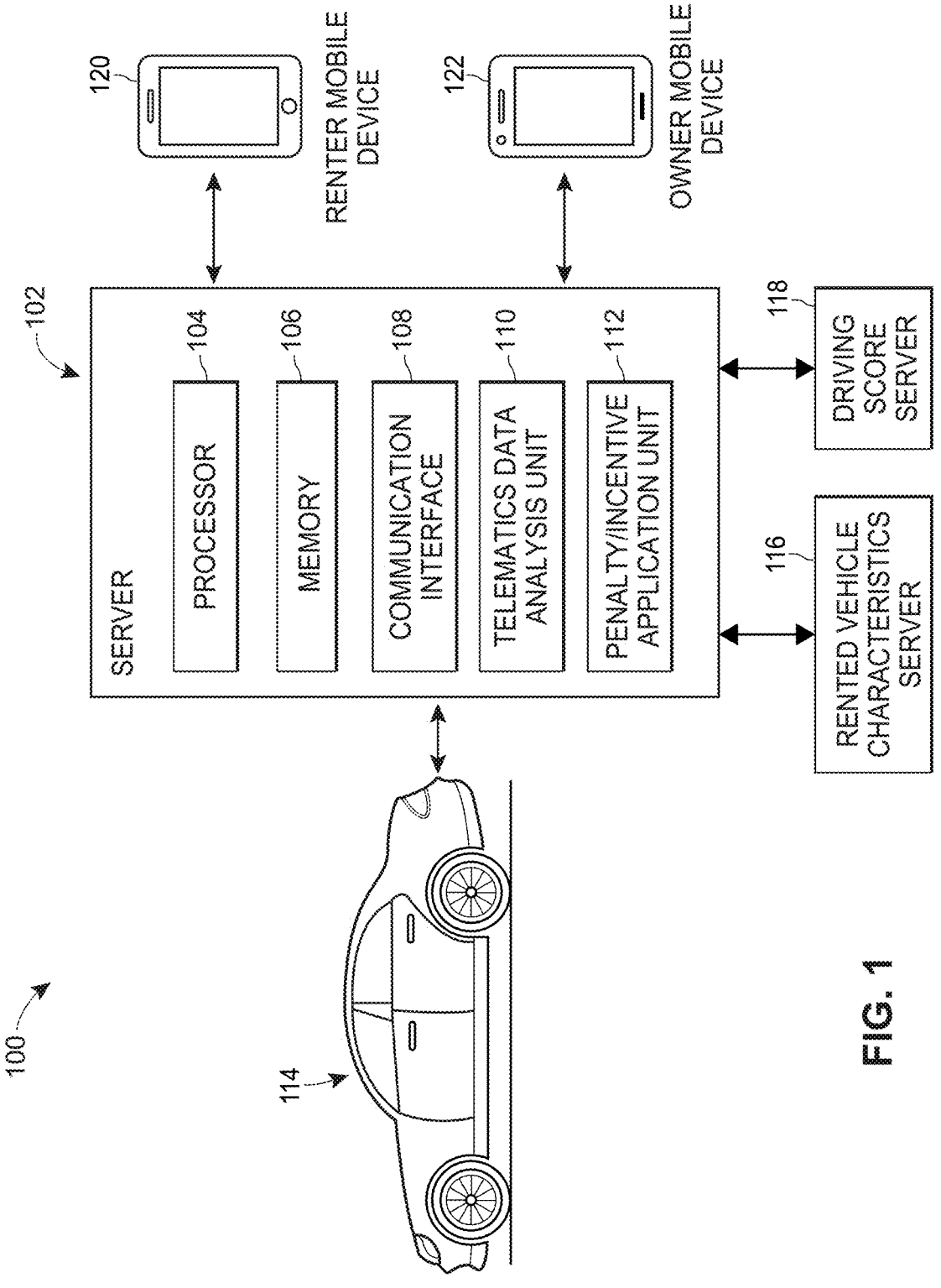
FIG. 1 illustrates an exemplary environment in which penalties and/or incentives may be applied to a renter based on telematics data.

Aspects of the present invention relate to vehicle rental platforms wherein telematics data indicative of operation of the rented vehicle by a driver/renter may be used to apply one or more penalties and/or incentives to the driver, e.g., as agreed upon in the rental terms. The vehicle rental platform may be a peer-to-peer vehicle rental platform or a business to consumer vehicle rental platform, for example.

A vehicle owner may establish terms for renting a vehicle, e.g., via a user interface of the vehicle rental platform. A potential renter of the owner's vehicle may have access to such terms before agreeing to rent the owner's vehicle. A potential vehicle renter may be required to agree to the established terms before renting the owner's vehicle. If a renter has agreed to the terms for renting the owner's vehicle, the vehicle owner may receive an indication that the renter has agreed to the terms. The indication may include the terms themselves.

At some point after the vehicle renter and vehicle owner have agreed to the terms, a telematics data collection device, at the vehicle, may collect telematics data. Telematics data may only be collected, stored and/or used if the individual (i.e., renter or owner) has authorized such collection/storage/use. Authorization may occur, for example, upon the renter and the owner signing up to the vehicle rental platform. The telematics data collection device may include one or more components of a sensor/telematics system within the rented vehicle and/or may include a personal electronic device (e.g., a smart phone) of the renter. The telematics data collection device may also include sensors and/or subsystems that generate the telematics data itself, or may simply collect the telematics data after another device or devices has/have generated the telematics data. The telematics data may include any sensed or monitored data that indicates the operation of the rented vehicle by the driver. The telematics data collection device may collect data over a period of time during which the renter is operating the rented vehicle. The period of time may be the duration of a trip of the rented vehicle or a duration of a rental period of the rented vehicle, for example.

A remote server (i.e., remote from the telematics data collection device) may identify one or more driving behaviors occurring during the period of time, with the driving behavior(s) being determined from the telematics data. The driving behavior(s) may be associated with turning behavior, braking behavior, and/or accelerating behavior, for example. Identifying the driving behavior(s) may include identifying one or more values associated with the driving behavior(s), such as values associated with acceleration, speed, and/or lateral force. As the term is used herein, "acceleration" may refer to either positive or negative acceleration (i.e., deceleration), unless the context of the usage makes it clear that only positive or only negative acceleration is contemplated. The value(s) may be telematics data values (e.g., sensor readings, operational parameters of the vehicle such as speed, etc.) or normalized or averaged telematics data values, for example. The one or more values may be values calculated using telematics data (e.g., a weighted sum of multiple telematics data values). As the term is used herein, a "driving behavior" may be a behavior that occurs during a particular moment in time (e.g., a single hard braking event), or a behavior that occurs over a longer duration of time (e.g., an average number of hard braking events per hour).

Each rented vehicle may have one or more vehicle characteristics (e.g., make, model, a particular design such as rear-wheel or all-wheel drive, a particular feature such as cruise control, vehicle age, number of miles driven, maintenance). The remote server may determine the one or more characteristics of the rented vehicle based on telematics data, such as sensor data associated with the rented vehicle. The remote server may also, or instead, determine characteristics of the rented vehicle from data received from the vehicle owner or a third party. The remote server may obtain the one or more characteristics of the rented vehicle.

Based on the driving behavior and characteristic(s) of the rented vehicle, the remote server may apply one or more penalties and/or incentives to the renter operating the rented vehicle. These penalties and/or incentives may be in accordance with the agreed upon terms between the vehicle renter and the vehicle owner. The remote server may apply the one or more penalties and/or incentives immediately after a driving behavior occurs, or at a later time. The remote server may apply the one or more penalties and/or incentives in response to a single instance of a driving behavior, or in response to multiple instances of a driving behavior or multiple instances of different driving behaviors. Causing an incentive and/or penalty to be applied to the driver may include comparing one or more values associated with the driving behavior(s) (as discussed above) to one or more threshold values. For example, a penalty may be applied if the one or more values fall outside a threshold value, and/or an incentive may be applied if the one or more values stay within a threshold value.

Threshold values may vary based on the one or more characteristics of the rented vehicle. For example, a threshold value for "negative acceleration" (which may be indicative of how "hard" the driver brakes) may be lower for a sedan than for a sports car, or a threshold value for "negative acceleration" may be lower for a minivan than for a sedan, etc. Threshold values may also vary based on characteristics of a renter operating the rental vehicle. For example, a threshold value for "g-force" may be lower for a young driver than for an middle-aged driver. The threshold values may be associated with one or more of acceleration, speed, or lateral force of the rental vehicle during operation by the renter, for example.

If a penalty and/or an incentive has been applied, the remote server may transmit an electronic message to the owner of the rented vehicle notifying the owner that a penalty and/or incentive has been applied to the renter operating the rented vehicle. The remote server may transmit the notification to the owner immediately after the penalty and/or incentive has been applied. The remote server may instead transmit the notification at the end of the rental period by the renter, or at the next instance of a regular interval of time during the rental period. In other embodiments, the notification may be transmitted at any other suitable time.

If a penalty and/or an incentive has been applied, the remote server may transmit an electronic message to the renter of the rented vehicle notifying the renter that a penalty and/or incentive has been applied to the renter. The remote server may transmit the notification to the renter immediately after the penalty and/or incentive has been applied, at the end of the rental period by the renter, or at the next instance of a regular interval of time during the rental period. Alternatively, the remote server may transmit the notification when the rented vehicle is known to be stopped, such as when the vehicle is at a traffic light or the rented vehicle is parked. The vehicle may be determined to be stopped using telematics data (e.g., time stamped data from a GPS unit of the renter's mobile device or the vehicle, or data from an inertial measurement unit of the renter's mobile device or the vehicle). In other embodiments, the notification may be applied at any suitable other time.

FIG. 1 depicts an exemplary environment 100 in which penalties and/or incentives may be applied to a renter based on telematics data. As illustrated in FIG. 1, the environment 100 includes a vehicle 114. The vehicle 114 may include a data collection device (not shown in FIG. 1) that collects various types of telematics data. The vehicle 114 may also include multiple sensors (not shown in FIG. 1) that collect various types of telematics data. The vehicle 114 may also carry a renter mobile device 120 and the renter mobile device 120 may collect various types of telematics data.

The telematics data collected at the vehicle 114 may include any data that may be sensed or monitored, and may be used to calculate or otherwise infer driving behaviors of the renter. For example, the data may include any one or more of speed information, acceleration information, braking information, steering information, location/position information (e.g., collected by a vehicular global positioning system (GPS) device), translational and/or rotational g-force information (e.g., collected by a gyroscope device), on-board diagnostic information, information collected by a camera, video camera, LiDAR, radar or other device sensing an environment external to the vehicle (e.g., sensing proximity to other vehicles or other objects, orientation with respect to other vehicles or other objects, etc.), automated safety and/or control system information (e.g., adaptive cruise control status and/or when cruise control is engaged/disengaged, forward and/or rear collision warning system outputs, lane departure system outputs, electronic stability control system status, etc.), and so on. In some implementations, however, the vehicle telematics data includes at least acceleration and location data for the vehicle 114.

The vehicle 114, and/or the renter mobile device 120, may send collected telematics data to a server 102 via a communication link. Additionally or alternatively, the renter mobile device 120 may send collected telematics data to the server 102 via a communication link. For example, the vehicle 114 may send collected telematics data over a first communication link and the renter mobile device 120 may send collected telematics data over a second communication link. Additionally, the vehicle 114 and/or the renter mobile device 120 may send collected telematics data to server 102 via one or more transmissions. For example, telematics data telematics data may be collected at vehicle 114 and/or renter mobile device 120 over the course of a rented vehicle trip and sent to the server 102 in a single transmission. Alternatively, telematics data may be collected at vehicle 114 and/or renter mobile device 120 at regular intervals and sent to the server 102 in multiple transmissions (e.g., after each regular interval).

The transmissions may be sent to server 102 via a wireless transmitter or transceiver that is coupled to the vehicle 114. Alternatively, the vehicle 114 may be equipped with a Bluetooth system that provides the telematics data to a smart phone or other portable communication device of the driver or a passenger, such as renter mobile device 120, and the smart phone or other portable communication device may transmit the data to the server 102 via a wireless (e.g., cellular) network. In other implementations, the vehicle 114 may include an interface to a portable memory device, such as a portable hard drive or flash memory device. In some of these implementations, the portable memory device may be used to download data from the data collection device and then manually carried to the server 102. In still other implementations, the portable memory device may be used to download telematics data from the data collection device to a driver's or passenger's computer device (e.g., a desktop computer, laptop computer, smartphone, etc.), which may in turn be used to transmit the telematics data to the server 102 via one or more wired and/or wireless networks.

The server 102 may include a processor 104, a memory 106, a communication interface 108, a telematics data analysis unit 110, and a penalty/incentive application unit 112, each of which will be described in more detail below. The processor 104 may include one or more processors (e.g., a central processing unit (CPU)) adapted and configured to execute various software applications and components of the server 102. The memory 106 may include one or more memories of one or more types (e.g., a solid state memory, a hard drive, etc.), and may include data storage containing a plurality of software applications, data used and/or output by such software applications, and/or a plurality of software routines, for example.

The communication interface 108 may include hardware (e.g., one or more physical ports, one or more network interface cards, one or more hardware or firmware processors, etc.) and/or software (e.g., software executed by the processor 104 or one or more other processors of the server 102) configured to enable server 102 to receive transmissions of data collected by different data collection devices and mobile devices (e.g., associated with different vehicles similar to the vehicle 114). If the data transmissions are made via the Internet, for example, the communication interface 108 may include an Ethernet port. Telematics data may be received at the communication interface 108 from the vehicle 114, the renter mobile device 120, or any other device located within the vehicle 114.

Generally, the telematics data analysis unit 110 may analyze the received telematics data. Telematics data analysis unit 110 may only receive and analyze telematics data corresponding to a rental duration of the rented vehicle by the renter, for example. Alternatively, the telematics data unit 110 may filter received telematics data to exclude any telematics data that does not correspond to the rental duration. By analyzing the telematics data, the telematics data analysis unit 110 may determine one or more driving behaviors of the renter during the period of time, and may determine a time and/or a location associated with each such driving behavior.

The telematics data analysis unit 110 may also determine one or more characteristics of the vehicle 114 using telematics data of the vehicle 114. For example, the odometer may indicate the number of miles driven by the vehicle 114. Sensors on or in the tires may indicate the quality of the tires, the air pressure, and/or the date of last replacement (e.g., abrupt changes in the rate of tire spinning may indicate worn tires), for example. Additionally or alternatively, telematics data analysis unit 110 may determine the one or more characteristics of the vehicle 114 by analyzing data received from the rented vehicle characteristics server 116. The rented vehicle characteristics server 116 may store or otherwise provide access to rented vehicle characteristics information, and may include only a single server or multiple servers. The rented vehicle characteristics server 116 may be owned and operated by a third party, for example. The telematics data analysis unit 110 may determine one or more characteristics of the vehicle 114 by using an identifier of the vehicle 114 (e.g., a VIN of the vehicle 114) to locate matching data in a database maintained by the rented vehicle characteristics server 116.

Based on the driving behavior(s) and one or more characteristics of the rented vehicle, the penalty/incentive application unit 112 may apply one or more penalties and/or incentives to the driver of the rented vehicle 114. The penalty/incentive application unit 112 may compare values associated with the driving behavior(s) to threshold values. Initially, in some embodiments, the owner of the vehicle 114 initially sets the threshold values (e.g., via the owner mobile device 122 when executing a peer-to-peer vehicle sharing application). Alternatively, server 102 (e.g., the penalty/ incentive application unit 112) may initially set the thresholds to default values. In either embodiment, the threshold values may then be modified based on the one or more characteristics of the rented vehicle 114 before being agreed upon by the owner and the renter as terms of the rental. In other embodiments, the server 102 (e.g., the penalty/incentive application unit 112) uses the one or more characteristics of the rented vehicle 114 to initially set the threshold values, rather than modifying previously set threshold values. A penalty or incentive may be applied if the values associated with the driving behavior fall within or exceed the threshold values. The penalty and/or incentive may be applied to an account of the renter associated with or linked to the vehicle rental platform, for example.

In some embodiments, one, some or all of the threshold values may be automatically set or modified based on the one or more characteristics of the rented vehicle 114 in which the driving behavior or set of driving behaviors occurred. For example, the threshold values may be set or modified to reflect that hard braking behavior is less acceptable because the vehicle 114 is known to have poor quality brakes (e.g., as detected by a sensor at the brakes of the vehicle 114) relative to most other vehicles. In this example, the threshold value for "negative acceleration" may be lowered, or set to a relatively low level. As another example, a threshold value for "negative acceleration" may be lower for a sedan than for a sport vehicle, and lower still for a minivan than a sedan.

The penalty/incentive application unit 112 may optionally utilize a driving score to determine if a penalty and/or incentive should be applied. Such driving scores may be calculated and stored by a driving score server 118, and the server 102 may access the driving scores by communicating with the driving score server 118 (e.g., via a long-range communication network such as the Internet). In other embodiments, the penalty/incentive application unit 112 or another component of the server 102 may calculate a driving score, and the server 102 may store the score in memory 106 or another memory. In still other embodiments, the penalty/ incentive application unit 112 calculates a driving score but the driving score server 118 stores the driving score. In such an embodiment, the server 102 may transmit the driving score to the driving score server 118 to be stored.

The driving score may be calculated based on the driving behavior(s), and possibly also the one or more characteristics of the rented vehicle. For example, an instance of hard braking may result in a lower driving score if the instance of hard braking occurred in a minivan as opposed to a sedan, and/or an instance of excessive acceleration may result in a lower driving score if the acceleration occurred in a vehicle that needs tire replacement as opposed to a vehicle on which the tires were recently replaced. In some embodiments where the driving score itself accounts for one or more characteristics of the rented vehicle, penalty/incentive application unit 112 need not modify any of its thresholds (discussed above) based on the one or more characteristics of the rented vehicle.

The penalty/incentive application unit 112 may optionally notify the owner of the vehicle 114 that a penalty or an incentive has been applied to the renter of the vehicle 114. The server 102 may send this notification to the owner mobile device 122, for example. The server 102 and more specifically the communication interface 108 may transmit the notification to the owner mobile device 122 immediately after the penalty and/or incentive has been applied, at the end of the rental period by the renter, or at the next instance of a regular interval of time during the rental period, for example. In other embodiments, the server 102 may send the notification at any suitable other time.

The penalty/incentive application unit 112 may also, or instead, notify the driver of the vehicle 114 that a penalty or an incentive has been applied to the renter. The server 102 may send this notification to the owner mobile device 120, for example. The server 102 and more specifically the communication interface 108 may transmit the notification to the renter mobile device 120 immediately after the penalty and/or incentive has been applied, at the end of the rental period by the renter, or at the next instance of a regular interval of time during the rental period, for example (e.g., with the same timing as notifications to the vehicle owner). Alternatively, the server 102 may transmit the notification to the driver when the rented vehicle 114 is known to be stopped, such as when the vehicle 114 is at a traffic light or parked. The server 102 may determine that the vehicle 114 is stopped using telematics data (e.g., time stamped data from a GPS unit of the renter mobile device 120 or the vehicle 114, or data from an inertial measurement unit of the renter mobile device 120 or the vehicle 114). In other embodiments, the server 102 may send the notification at any suitable other time.

Figure 2:
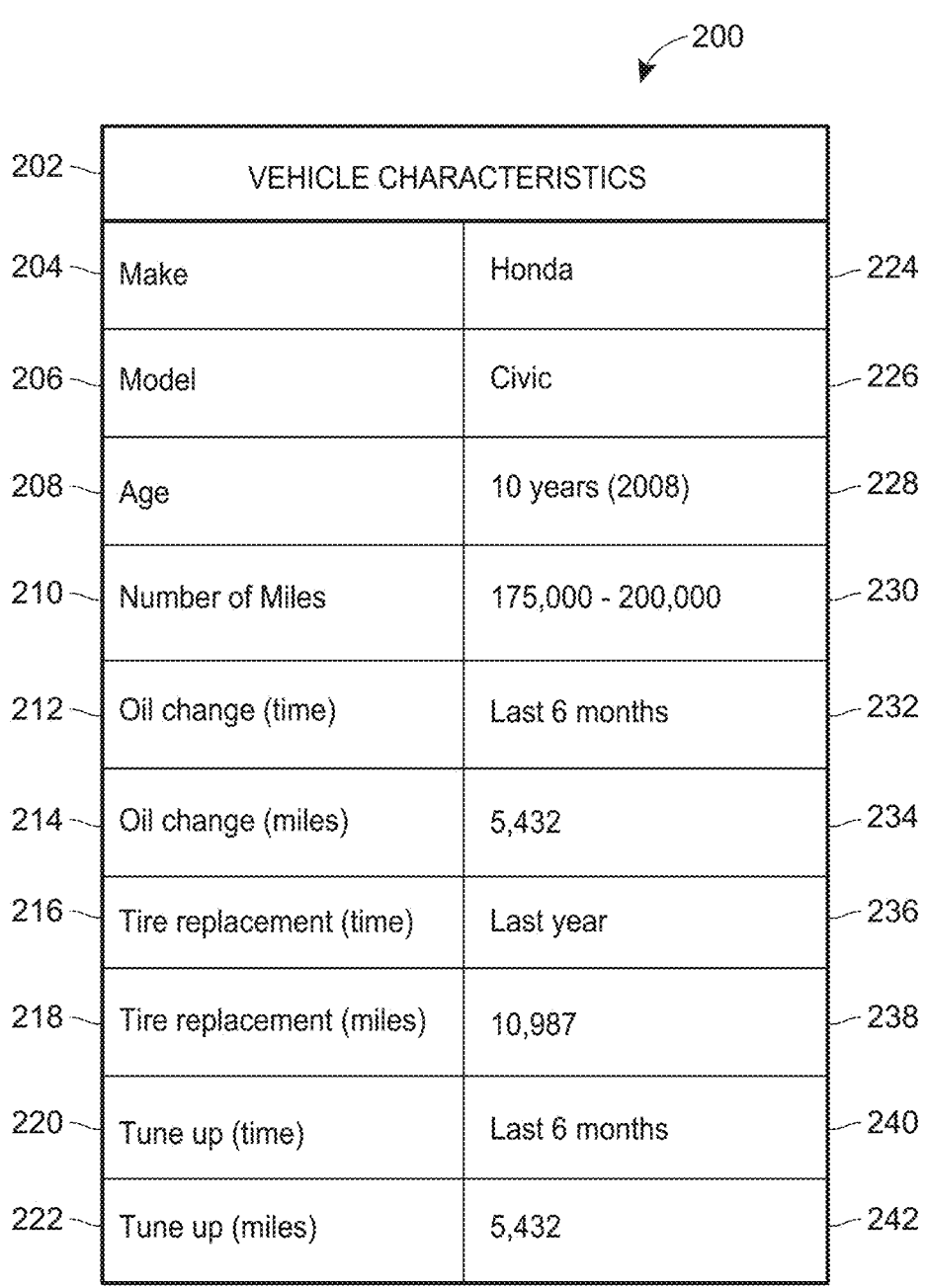
FIG. 2 illustrates an exemplary chart of characteristics of a rented vehicle.

Operation of the components of the environment 100 will now be described in connection with FIGS. 2 through 4, according to various implementations and scenarios. Referring first to FIG. 2, an exemplary chart 200 of characteristics of a rented vehicle is shown. As shown, vehicle characteristics 202 may include a make 204, a model 206, an age 208 of the vehicle, a total number of miles 210 traveled by the vehicle, a time 212 within which the last oil change was obtained for the vehicle, a number of miles 214 since the last oil change was obtained for the vehicle, a time 216 within which the last tire replacement was obtained for the vehicle, a number of miles 218 since the last tire replacement was obtained for the vehicle, a time 220 within which the last tune up was obtained for the vehicle, and a number of miles 222 since last tune up was obtained for the vehicle. In additional embodiments, more or fewer vehicle characteristics may be included. Any number of the one or more vehicle characteristics may be utilized to cause a penalty and/or incentive to be applied. For example, the penalty or incentive application may be based on the make 204 and the model 206 of the vehicle only, or based on the make 204, the model 206, and the age 208 of the vehicle, etc. Similarly, any number of the one or more vehicle characteristics may be utilized to set or modify threshold values. For example, a threshold value for negative acceleration may be lower for a vehicle identified from the make 204 and the model 206 to be a minivan than a vehicle identified from the make 204 and the model 206 to be a sedan.

Each characteristic of the rented vehicle may have an associated value. For example, the make 204 has an associated value 224, the model 206 has an associated value 226, the age 208 has an associated value 228, the number of miles 210 has an associated value 230, the time 212 has an associated value 232, the number of miles 214 has an associated value 234, the time 216 has an associated value 236, the number of miles 218 has an associated value 238, the time 220 has an associated value 240, and the number of miles 222 has an associated value 242. Each associated value may be an exact value or it may be a range of values. For example, the age 208 of the vehicle may be indicated as 10 years, as 10-12 years, as the purchase date of the vehicle, and so on.

Each vehicle characteristic may change and be updated at any given point. For example, the number of miles 210 driven by the vehicle may change as the vehicle continues to be driven. This may be recorded in the telematics data and updated at the rented vehicle characteristics server 116, for example.

Figures 3A, 3B:
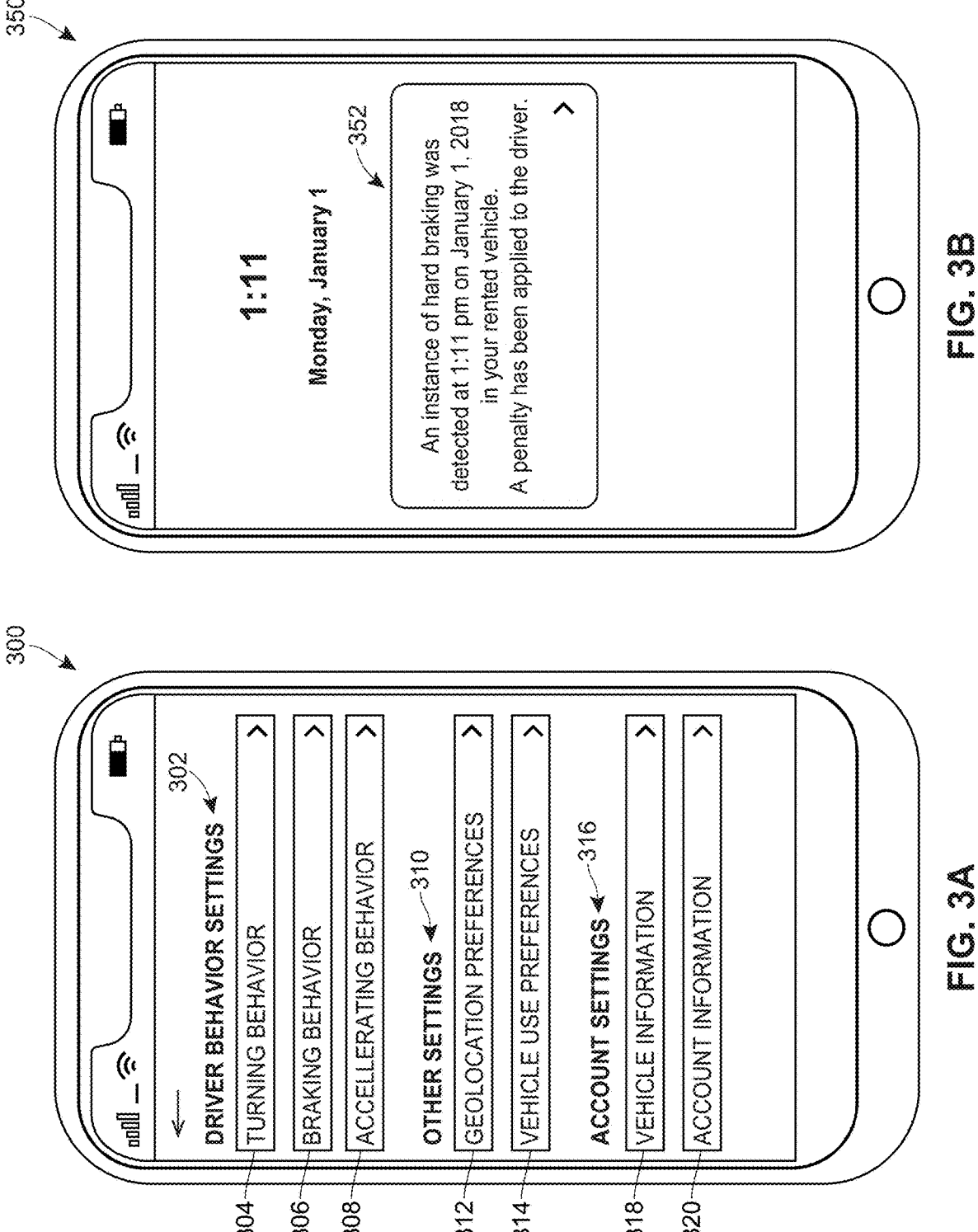
FIG. 3A illustrates an exemplary user interface by which a vehicle owner may establish vehicle rental terms.
FIG. 3B illustrates an exemplary user interface at which a vehicle owner may be notified that one or more penalties and/or incentives have been applied.

FIG. 3A illustrates an exemplary user interface 300 by which a vehicle owner may establish vehicle rental terms. The exemplary user interface 300 may be presented via an owner's mobile device such as owner mobile device 122 or any other device of the vehicle owner. The vehicle owner may establish vehicle rental terms by modifying driving behavior settings 302. The vehicle owner may establish vehicle rental terms at any time. The driving behavior settings 302 may include settings of a turning behavior control 304, settings of a braking behavior control 306, and settings of an accelerating behavior control 308. The driving behavior settings 302 may include settings of fewer, more and/or different controls than those shown in FIG. 3A. The vehicle owner may use the driving behavior settings 302 to establish vehicle rental terms. For example, the vehicle owner may establish acceptable turning behavior by modifying the turning behavior control 304. Acceptable turning behavior may be constrained, for example, by acceptable g-force on the vehicle. Driving behavior settings 302 may be translated to threshold values by server 102, for example. An owner of the rented vehicle may set specific penalties and or incentives at the driving behavior settings 302 and more specifically at the turning behavior control 304, braking behavior control 306, and accelerating behavior control 308 options. For example, a vehicle owner whose vehicle has a delicate steering system may opt to set stricter penalties with the turning behavior control 304 than with other behavior controls (e.g., a vehicle owner may set a monetary fine of twenty-five dollars per instance of unacceptable turning behavior).

Exemplary user interface 300 may also provide other settings 310 that an owner of the rented vehicle may modify. In the embodiment shown, the settings 310 include settings of a geolocation preferences control 312 and a vehicle use preferences control 314. For example, using the geolocation preferences control 312, a vehicle owner may set a geolocation boundary on where the rented vehicle may be driven (e.g., a vehicle owner in the suburbs of a large city may wish to set a geolocation preference such that the rented vehicle stays in the suburbs and is not driven into the city). Using the vehicle use preferences control 314, an owner of the rented vehicle may set preferences more generally as to how a vehicle may be used (e.g., with respect to actions other than driving behaviors or location). For example, an owner may set preferences regarding the presence of children and/or pets in the vehicle, and/or whether the vehicle may be used for purposes such as moving heavy items (e.g., furniture or yard items). Such activity may be detected by the rented vehicle, for example vehicle 114, using a weight sensor at the seats or hatchback, a microphone, a camera, and/or any other suitable type of sensor(s). A renter of the rented vehicle may be penalized or incentivized based on the settings of the turning behavior control 304, braking behavior control 306, accelerating behavior control 308, geolocation preferences control 312 and/or vehicle use preferences control 314, in combination with the corresponding portions of the telematics data.

The vehicle owner may also be able to modify or input information associated with the owner's account via an account settings control 316. The owner may make these modifications using a vehicle information control 318 and/or an account information control 320, for example. At the vehicle information control 318, the vehicle owner may input information regarding the one or more characteristics of the rented vehicle 114 (e.g., make, model, year, etc.). Input of such information may be required before the vehicle owner is able to offer the vehicle 114 for rent. The vehicle owner may further be prompted at vehicle information control 318 to periodically update information regarding the one or more characteristics of the rented vehicle 114.

Once the penalty and/or incentive has been applied, the server 102 may notify the renter and/or owner of the vehicle that the penalty has been applied. FIG. 3B illustrates an exemplary user interface 350 via which a vehicle owner may receive a notification 352 indicating that one or more penalties and/or incentives have been applied. The server 102 and more specifically the communication interface 108 may send notification 352 as soon as the penalty is applied, or at any other time. The notification 352 may include the reason why a penalty or incentive was applied (as depicted in FIG. 3B) or may not include such information.

The server 102 and more specifically the communication interface 108 may send a notification the same as or similar to notification 352 to the renter of the rented vehicle. The notification may optionally allow the renter to access more information about the penalty. The server 102 may send the notification to the renter immediately, or only when the rented vehicle is known to be stopped. The notification may be sent when the rented vehicle is known to be turned off, for example. Additionally, a notification that a penalty is about to be applied may be sent to the renter. For example, if the renter has agreed to a "three strike" system for a penalty, a notification that the renter has incurred the second "strike" may be delivered to the renter.

FIG. 4 is a flow diagram of an exemplary method 400 of incentivizing and/or penalizing a vehicle renter. In one embodiment, the method 400 may be implemented by the processor 104 of the server 102. As used herein, the term "server" may refer to a single computing device at a single location, or to a number of computing devices (e.g., distributed across a number of different locations).

In the method 400, an indication that a driver has agreed to terms for renting a vehicle from an owner of the vehicle may be received (block 402). The terms may include potential application of penalties or incentives to the driver based on driving behavior. The terms may be set by the owner of the rented vehicle, via a user interface accessed by the owner. For example, the owner may set the terms via the user interface 300 of FIG. 3A. The terms may specify preferences relating to one or more particular driving behaviors. The terms may specify certain instances in which driving behavior(s) is/are allowed or not allowed. The terms may further specify other vehicle owner preferences, such as geolocation preferences, and/or vehicle use preferences other than driving behaviors. Terms may vary based on a profile of a vehicle renter, and/or based on the rented vehicle.

The driver may accept the terms explicitly or implicitly. In some embodiments, the driver accepts the terms via a user interface similar to that shown in FIG. 3A. The terms may be transmitted to a sever implementing the method 400, such as server 102. The terms may be stored in the memory of the server (e.g., memory 106), and may be used by a software unit (e.g., the penalty/incentive application unit 112) to determine if a penalty and/or incentive should be applied.

Telematics data collected over a period of time may be received (block 404). The telematics data is indicative of the operation of the rented vehicle by the driver during the period of time. The data collection device may be similar to any of the different implementations discussed above (e.g., including one or multiple components, etc.). In some embodiments and/or scenarios, the vehicle telematics data includes a plurality of subsets of vehicle telematics data, with each subset corresponding to a different trip. The vehicle telematics data may be received by any suitable technique(s), such as any of the techniques for obtaining vehicle telematics data described above in connection with FIG. 1 (e.g., transferring to/from a portable memory, using wired and/or wireless communications, etc.), for example. The vehicle telematics data may include any data from which driving behaviors and/or features of the driving environment may be inferred or calculated. For example, the vehicle telematics data may include acceleration data, braking data, cornering data, g-force data, visual data, location data, etc., and may include data that was generated by an accelerometer, gyroscope, GPS device, camera, lidar, and/or one or more other units or sensor types.

The period of time may be the full duration of time during which the renter has rented the rented vehicle, the duration of a single trip by the renter in the rented vehicle, or any other duration of time. The telematics data may be received at the server implementing the method 400 (e.g., at server 102). The telematics data may be stored at the memory 106 and processed by the processor 104 (e.g., when executing instructions of the telematics data analysis unit 110), for example.

One or more driving behaviors of the driver during the period of time may be identified by analyzing the telematics data (block 406). The one or more driving behaviors may be identified by the server (e.g., by the telematics data analysis unit 110). The one of more driving behaviors may each correspond to certain portions of the telematics data, and may take place at a certain point in time (e.g., discrete driving events) or over a longer duration of time (e.g., average or maximum speeds, g-forces, etc., over a longer time period).

One or more characteristics of the rented vehicle may be identified (block 408). The one or more characteristics of the rented vehicle may be determined from the telematics data, and/or based on rented vehicle characteristics data received from the vehicle owner or a third party server. The one or more characteristics of the rented vehicle may include the make of the vehicle, the model of the vehicle, the age of the vehicle, the number of miles driven by the vehicle, the oil change status of the vehicle, the tire replacement status of the vehicle, the tune up status of the vehicle, and/or other characteristics.

One or more penalties or incentives may be applied (block 410). The application of the one or more penalties or incentives may be based on the one or more driving behaviors and the one or more characteristics of the rented vehicle. For example, the one or more driving behaviors may trigger a penalty when the behavior(s) occur(s) in a vehicle with certain characteristics, but not in a vehicle with other characteristics. The one or more driving behaviors may each correspond to one or more values (e.g., acceleration, speed, and/or lateral force). In some embodiments, the one or more penalties or incentives are applied if the one or more values fall outside (or stay within) a threshold value, wherein the threshold value may be based on the one or more characteristics of the rented vehicle (e.g., make of the rented vehicle, model of the rented vehicle, age of the rented vehicle, number of miles driven by the rented vehicle, and/or maintenance of the rented vehicle). Alternatively, the one or more penalties or incentives are applied if a driving score does not meet a threshold, with the driving score being computed based on the one or more characteristics of the rented vehicle. The renter of the vehicle and/or the owner of the vehicle may optionally be notified that a penalty has been applied (e.g., via the user interface of FIG. 3B).

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and method for applying a penalty or an incentive to a driver of a rented vehicle based on telematics data. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A system comprising:
a processor; and
computer-readable media storing computer-executable instructions that, when executed by the processor, cause the processor to perform operations comprising:
receiving, by the processor, operating data indicative of a driving behavior associated with a driver operating a particular vehicle, the driving behavior being characterized by a behavior value;
identifying, by the processor and based on a unique identifier of the particular vehicle, a maintenance record associated with the particular vehicle;
extracting, by the processor and from the maintenance record, information indicating a maintenance activity previously performed on the particular vehicle;
determining, by the processor, based on the extracted information and current vehicle information corresponding to the extracted information, a value indicative of an operating capability of the vehicle;
receiving, by the processor and from a computing device separate from the processor and the particular vehicle, an input indicating a preferred driving behavior;
determining, by the processor, and based on the input, a threshold value corresponding to the driving behavior;
determining, by the processor, and based at least in part on the value indicative of the operating capability, a modified threshold value corresponding to the driving behavior,
wherein the modified threshold value is specific to the particular vehicle;
determining, by the processor, that the behavior value is less than the modified threshold value; and
based on determining that the behavior value is less than the modified threshold value, applying, by the processor, an incentive to an electronic account associated with the driver.

2. The system of claim 1, wherein the operating data includes telematics data associated with the vehicle captured by a sensor carried by the vehicle.

3. The system of claim 1, wherein the operating data includes data from a sensor carried by the vehicle, the data comprising at least one of:
an air pressure in a tire,
a rate of spin of the tire, or
a number of miles driven since last replacement of the tire.

4. The system of claim 1, wherein the value indicative of the operating capability of the vehicle comprises at least one of:

an age of the vehicle,
a number of miles traversed by the vehicle, or
a time elapsed or miles traversed after a maintenance service of the vehicle.

5. The system of claim 1, wherein the behavior value is a first value, and the operations further comprise:
determining, by the processor, based at least in part on the operating data, an additional driving behavior associated with the driver of the vehicle, the driving behavior being characterized by a second value;
determining, by the processor, that the second value meets or exceeds an additional threshold value, wherein the additional threshold value is based on the input and an additional value included in the maintenance record of the vehicle; and
modifying, by the processor, the electronic account associated with the driver based at least in part on the second value meeting or exceeding the additional threshold value.

6. The system of claim 1, wherein the computing device is associated with an owner of the particular vehicle, and the operations further comprising:
sending, by the processor, an indication of the modified threshold value to the computing device;
receiving, by the processor and from the computing device and based at least in part on the indication, a request to adjust the modified threshold value;
generating, by the processor, an updated threshold value based at least in part on the request; and
determining, by the processor, that the behavior value is less than the updated threshold value,
wherein the incentive is applied based at least in part on the behavior value being less than the updated threshold value.

7. The system of claim 1, wherein the driving behavior is associated with at least one of:
turning of the vehicle while under control of the driver,
braking of the vehicle while under control of the driver, or
acceleration of the vehicle while under control of the driver.

8. The system of claim 1, wherein the maintenance record is associated with a first time, the operations further comprising:
receiving, by the processor, an updated maintenance record associated with the particular vehicle at a second time after the first time;
updating, by the processor and based on the updated maintenance record, the value of the operating capability; and
generating, by the processor and based on the updated value of the operating capability, an updated threshold value,
wherein the incentive is applied based at least in part on the behavior value being less than the updated threshold value.

9. The system of claim 1, the operations further comprising:
determining, by the processor and based on the driving behavior and the value indicative of the operating capability of the vehicle, a driving score associated with the driver;
transmitting, by the processor and to a remote server, the driving score for storage associated with the driver,
wherein the incentive is applied based at least in part on the driving score.

10. The system of claim 1, the operations further comprising:

determining, by the processor, and based on the maintenance record, an additional information, included in the maintenance record, that affects the operating capability of the vehicle; and determining, based on an additional value indicative of the operating capability, an adjusted threshold value by adjusting the modified threshold value, wherein the incentive is applied based at least in part on the behavior value being less than the adjusted threshold value.

11. A computer-implemented method comprising:

receiving operating data, wherein the operating data is indicative of a driving behavior associated with a driver operating a particular vehicle, the driving behavior being characterized by a behavior value;

identifying, based on a unique identifier of the particular vehicle, a maintenance record associated with the particular vehicle;

extracting, from the maintenance record, information indicating a maintenance activity previously performed on the vehicle;

determining, based on the extracted information and current vehicle information corresponding to the extracted information, a value indicative of an operating capability of the vehicle;

receiving, from a computing device separate from the particular vehicle, an input indicating a preferred driving behavior;

determining, based on the input, a threshold value corresponding to the driving behavior;

determining, based at least in part on the value indicative of the operating capability, a modified threshold value corresponding to the driving behavior, wherein the modified threshold value is specific to the particular vehicle;

determining that the behavior value is less than the modified threshold value; and based on determining that the behavior value is less than the modified threshold value, applying an incentive to an electronic account associated with the driver.

12. The computer-implemented method of claim 11, wherein the computing device is associated with an owner of the particular vehicle, the method further comprising:

sending a notification of the incentive to at least one of the computing device or an additional computing device associated with the driver.

13. The computer-implemented method of claim 11, further comprising:

receiving an indication that the driver has agreed to terms of a contract corresponding to renting the vehicle from an owner of the particular vehicle, wherein the terms include potential application of changes to the electronic account of the driver based on the driving behavior, and the incentive is applied based at least in part on the indication.

14. The computer-implemented method of claim 11, wherein the computing device is associated with an owner of the particular vehicle, the method further comprising:

sending an indication of the modified threshold value to the computing device;

receiving, from the computing device and based at least in part on the indication, a request to update the modified threshold value; and updating, based at least in part on the request, the modified threshold value.

15. The computer-implemented method of claim 11, further comprising:

determining, based on the maintenance record, an additional information included in the maintenance record affecting the operating capability of the vehicle;

adjusting, based on an additional value indicative of the operating capability, the modified threshold value, wherein the incentive is applied based at least in part on the behavior value being less than the modified threshold value after the adjustment.

16. The computer-implemented method of claim 11, wherein the maintenance record is associated with a first time, the method further comprising:

receiving an updated maintenance record associated with the particular vehicle at a second time after the first time;

updating, based on the updated maintenance record, the value indicative of the operating capability; and generating, based on the updated value indicative of the operating capability, an updated modified threshold value, wherein the incentive is applied based at least in part on the behavior value being less than the updated modified threshold value.

17. The computer-implemented method of claim 11, wherein the computing device is associated with an owner of the particular vehicle and the modified threshold value is a first modified threshold value, the method further comprising:

identifying, a second maintenance record associated with a second vehicle associated with the owner;

determining, based on the second maintenance record, a second value indicative of the operating capability associated with the second vehicle; and determining, based on the threshold value and the second value indicative of the operating capability, a second modified threshold value corresponding to the second vehicle, different from the first modified threshold value.

18. A non-transitory computer readable media storing computer-executable instructions that, when executed by a processor of a computing device associated with a peer-to-peer vehicle-sharing platform, cause the computing device to perform operations comprising:

receiving operating data, wherein the operating data is indicative of a driving behavior associated with a driver operating a particular vehicle, the driving behavior being characterized by a behavior value;

identifying, based on a unique identifier of the particular vehicle, a maintenance record associated with the particular vehicle;

extracting, from the maintenance record, information indicating a maintenance activity previously performed on the vehicle;

determining, based on the extracted information and current vehicle information corresponding to the extracted information, a value indicative of an operating capability of the vehicle;

receiving, from a first device separate from the computing device and the particular vehicle, an input indicating a preferred driving behavior;

determining, based on the input, a threshold indicating that the driving behavior qualifies for an incentive;

determining, based at least in part on the value indicative of the operating capability, a modified threshold corresponding to the driving behavior, wherein the modified threshold is specific to driving behaviors while operating the particular vehicle;

determining that the behavior value satisfies the modified threshold; and based on determining that the behavior value satisfies the modified threshold, applying an incentive to an electronic account associated with the driver.

19. The non-transitory computer readable media of claim 18, wherein the first device is associated with an owner of the particular vehicle, the operations further comprising:

receiving an indication that the driver has agreed to terms of a contract corresponding to renting the vehicle from the owner, wherein the incentive is applied based at least in part on the indication; and sending a notification of the incentive to at least one of the first device or a second device associated with the driver.

20. The non-transitory computer readable media of claim 18, wherein the value indicative of the operating capability of the vehicle comprises at least one of:

an age of the vehicle, a number of miles traversed by the vehicle, or a time elapsed or miles traversed after a maintenance service of the vehicle.

* * * * *